Jan. 29, 1924.

J. E. JANES

HANDLE PROTECTOR

Filed July 27, 1923

1,482,194

J. E. Janes, Inventor

By CA Knowles.

Attorneys

Patented Jan. 29, 1924.

1,482,194

UNITED STATES PATENT OFFICE.

JOHN ELMER JANES, OF INDUSTRY, ILLINOIS.

HANDLE PROTECTOR.

Application filed July 27, 1923. Serial No. 654,195.

*To all whom it may concern:*

Be it known that I, JOHN E. JANES, a citizen of the United States, residing at Industry, in the county of McDonough and State of Illinois, have invented a new and useful Handle Protector, of which the following is a specification.

This invention relates to cooking utensils and more particularly to handle protectors for percolators.

The object of the invention is to provide a simple and efficient device which may be quickly and easily applied to a coffee percolator equipped with a wooden handle such as is ordinarily used with utensils of this character to protect the handle against burning during the percolating operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 3:
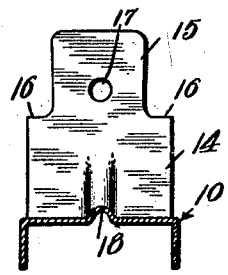
Fig. 3 is a transverse section taken on the line 3—3 of Fig. 1.
Figure 1:
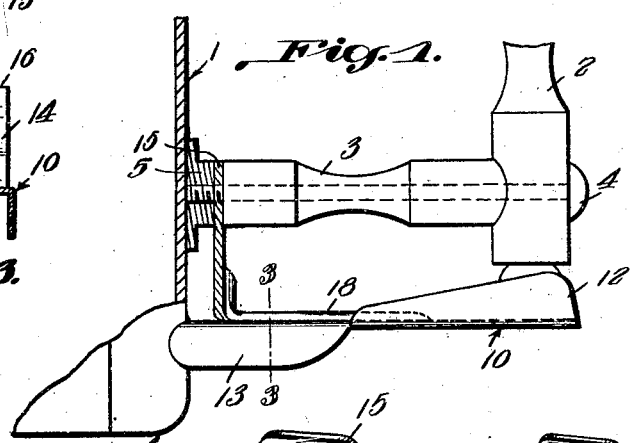
Figure 1 represents a side elevation of one form of protector constructed in accordance with this invention shown applied, the percolator in connection with which it is used being shown in section.
Figures 2, 4, 5:
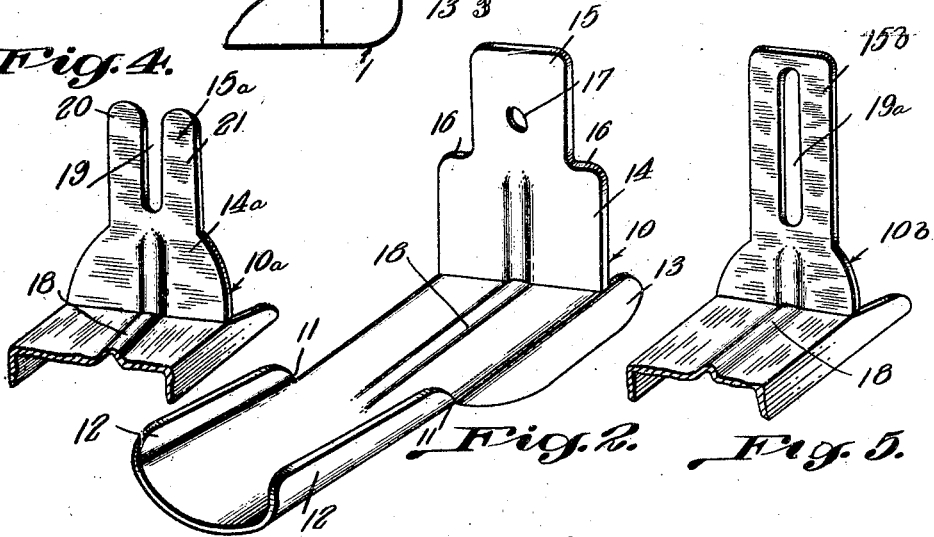
Fig. 2 is a detail perspective view of the protector shown in Fig. 1 detached.
Fig 4 is a detail perspective view of a portion of another form of protector.
Fig. 5 is a similar view showing still another form.

In the embodiment illustrated in Figs. 1 to 3 a portion of the percolator is shown at 1 having the usual wooden handle 2 connected at its upper and lower ends by laterally extending wooden arms as 3 by means of screws as 4 which extend transversely through the ends of the handle 2 and longitudinally through the arms as 3 and are engaged with sockets 5 carried by the percolator body.

The protector 10 constituting this invention in the form shown in Figs. 1 to 3 is constructed of sheet metal of any suitable kind preferably of aluminum, which sheet is slit transversely at 11 along the side edges thereof and said edges bent to form pairs of flanges 12 and 13, the flanges 12 being bent inwardly and those 13 outwardly for a purpose presently to be described.

One end of the plate is bent at right angles to provide an attaching arm or plate 14 which has a reduced extension 15 at its free end provided with shoulders 16 at its base. This extension or tongue 15 is designed to be inserted between the socket 5 and the inner end of arm 3 as shown clearly in Fig. 1 and the tongue 15 is apertured as shown at 17 for the passage of the screw 4 which connects the handle with the percolator. The positioning of the protector as shown in Fig 1 locates the body thereof directly below the wooden handle 3 the flanges 13 projecting at their rear ends beyond arm 14 and bearing against the percolator body while those 12 extend upwardly and straddle the lower end of handle 2.

A stiffening rib 18 extends longitudinally of the percolator body and arm as shown clearly in Fig. 2 and is preferably formed by striking up the material from which the protector is constructed.

It will thus be seen that the use of this protector will prevent the flames from scorching the handle which frequently occurs with utensils of this character.

This device may be very cheaply constructed and easily applied, it being necessary only to withdraw the screw 4 and slip the tongue 15 in between the socket 5 and the percolator body and screw home the screw through the aperture 17 in the tongue 15.

In the form shown in Fig. 4 the protector 10ª is similar to that shown at 10 in Figs. 1 to 3 except that the arm 14ª has no shoulders at its juncture with the tongue 15ª which latter is equipped with an open slot 19 forming furcations 20 and 21 which are designed to straddle the screw 4 between the socket 5 and the body of the percolator so that it will not be necessary to disengage the screw from the pot it being unscrewed only a distance sufficient to permit the tongue to slip between the socket 5 and the percolator body.

In the form shown in Fig. 5 the protector 10$^b$ is the same as that shown in Fig. 4 except that the slot 19$^a$ is closed instead of open permitting the adjustment of the protector relatively to the handle but necessitating separation of the screw 4 from the precolator to permit the tongue 15$^b$ to be properly located.

The slots 19 and 19$^a$ provide for the adjustment of the protector to adapt it for use with handles of different sizes.

Figure 7:
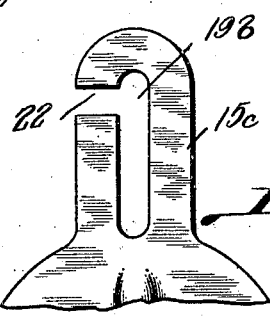
Fig. 7 is a rear elevation of a portion of another form of protector.
Figure 6:
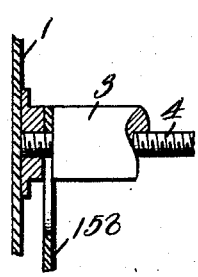
Fig. 6 is a detail sectional view showing the connection of the percolator handle with the percolator and the form of protector illustrated in Fig. 5 shown applied.

In the form shown in Fig. 7 the tongue 15$^c$ is similar to that shown in Fig. 5 except that the slot 19$^b$ opens through one side wall of the tongue as shown at 22 and which greatly facilitates the application and removal of the protector permitting the tongue to be slipped sidewise into engagement with screw 4. By providing the opening 22 at one side of the slot 19$^b$ there is no danger of the protector dropping off should the screw 4 loosen, as it frequently does.

Various changes in the form, shape, proportion and other minor details of construction may be made without departing from the principle or sacrificing any of the advantages of the claimed invention.

I claim:—

1. A percolator handle protector comprising a plate having a right angular extension at one end to form an attaching tongue, said tongue having a longitudinally extending slot with an opening through one side wall thereof.

2. A protector of the class described comprising a plate having a right angular extension at one end to form an attaching element, said plate and element having a stiffening rib, the side edges of said plate being slit transversely and bent to form flanges extending in opposite directions, one pair of said flanges being designed to engage the percolator and the other to straddle its handle.

3. A protector of the class described comprising a plate having an angular extension at one end to form an attaching tongue, the side edges of said plate being slit transversely and the front portions bent in one direction and the rear portions in the opposite direction providing means for engaging the percolator and straddling its handle.

In testimony that I claim the foregoing as my own, I have hereto affixed my signature in the presence of two witnesses.

JOHN ELMER JANES.

Witnesses:
HARRISON BRANDON,
GEO. R. CLARKE.